3,267,058
POLYURETHANES PREPARED FROM POLYISO-
CYANATES AND POLYOLS DERIVED FROM HY-
DROXYL COPOLYMERS
Joseph C. Hixenbaugh, Burton, W. Va., assignor to Mobay
Chemical Company, Pittsburgh, Pa., a corporation of
Delaware
No Drawing. Filed Oct. 30, 1961, Ser. No. 148,734
10 Claims. (Cl. 260—23)

This invention relates to drying oils and more particularly to isocyanate-modified drying oils which have improved physical properties.

It has been proposed heretofore to prepare drying oils which contain urethane groups by reacting a vegetable oil, for example, with a polyhydric alcohol and then reacting the resulting product having free hydroxyl groups with an organic polyisocyanate in an amount just enough to react with all of the hydroxyl groups to prepare a modified drying oil containing urethane groups. Such an oil may then be applied to a substrate where it will cure by well known and conventional reaction with oxygen in the air. This is indeed one of the oldest commercial uses for isocyanates and was long ago the subject of a U.S. patent to Pratt et al. No. 2,358,475.

Many systems have been proposed heretofore in order to improve on the chemical resistance, hardness and flexibility of isocyanate-modified drying oils. One approach has been to prepare two component systems, one based on the polyol and the other containing the isocyanate. These two component systems must be maintained in separate containers until shortly before they are to be applied to a substrate thus creating problems of storage and mixing by the coating applicator.

One heretofore known means of overcoming the lack of chemical resistance has been to use an allyl alcohol-styrene copolymer for reaction with a diisocyanate to prepare coating compositions which have good hardness and good chemical resistance. These products, however, have poor flexibility, in fact, they are too brittle for many applications and usually exhibit poor adhesion to metal surfaces. Moreover, the products based on an organic polyisocyanate and a copolymer of allyl alcohol and styrene do not weather well. In other words, they chalk badly on exposure to ultra-violet light. Previous attempts to increase the flexibility and weathering properties of these coatings have resulted in an unsatisfactory decrease in hardness.

It is therefore an object of this invention to provide an isocyanate-modified drying oil which is substantially devoid of the foregoing disadvantages. Another object of this invention is to provide drying oils which have improved resistance to outdoor weather conditions. A principal object of this invention is to provide isocyanate-modified drying oils which have improved flexibility and chemical resistance.

The foregoing objects and others which will become apparent from the following description are accomplished in accordance with this invention, generally speaking, by providing critical proportions of organic polyisocyanate and preferably organic diisocyanate in conjunction with the alcoholysis product from copolymers of an ethylenically unsaturated monohydric alcohol and an alkenyl substituted aromatic compound, a drying or semi-drying vegetable oil or unsaturated acids therefrom and a low molecular weight polyhydric alcohol having 2 to 6 hydroxyl groups. It is an essential feature of this invention that from about 2 percent by weight to about 25 percent by weight of the total reactive components of the reaction mixture be composed of the copolymer of an ethylenically unsaturated monohydric alcohol and an alkenyl substituted aromatic compound. Moreover, it is preferred that the proportion of organic polyisocyanate and preferably organic diisocyanate which is employed in conjunction with the copolymer be sufficient to bring the total percentage by weight of the copolymer and diisocyanate in the reaction mixture to a value between about 20 percent by weight and about 45 percent by weight. However, when less than about 15 percent by weight of the copolymer is used, a proportionately smaller amount of isocyanate is used. In other words, when 2 percent by weight of the copolymer is used, an amount of organic diisocyanate between about 18 percent by weight and about 30 percent by weight is employed in conjunction therewith. For 14 percent by weight of copolymer, one may use from about 18 to about 44 percent of the total percentage as a copolymer-isocyanate mixture. This will be better illustrated by the following table in which all numbers indicate percent by weight:

TABLE I

| Copolymer | Copolymer and Diisocyanate | Vegetable Oil and Polyhydric Alcohol |
|---|---|---|
| 2 | 20–32 | 68–80 |
| 3 | 20–33 | 67–80 |
| 4 | 20–34 | 66–80 |
| 5 | 20–35 | 65–80 |
| 6 | 20–36 | 64–80 |
| 7 | 20–37 | 63–80 |
| 8 | 20–38 | 62–80 |
| 9 | 20–39 | 61–80 |
| 10 | 20–40 | 60–80 |
| 11 | 20–41 | 59–80 |
| 12 | 20–42 | 58–80 |
| 13 | 20–43 | 57–80 |
| 14 | 20–44 | 56–80 |
| 15–25 | 20–45 | 55–80 |

In the table, from about 18 percent to about 30 percent by weight of diisocyanate is employed in every formulation. The relative amounts of vegetable oil and polyhydric alcohol must be varied to make the total 100 percent by weight with the desired hydroxyl number for the initial alcoholysis product. It is preferred to use from about 50 to about 80 percent by weight of the vegetable oil.

Any suitable copolymer of an ethylenically unsaturated monohydric alcohol and an alkenyl substituted aromatic compound may be used. It is preferred to use the copolymer of allyl alcohol and styrene. Any suitable ethylenically unsaturated monohydric alcohol may be used such as, for example, allyl alcohol, chloroallyl alcohol, methallyl alcohol, beta-ethyl allyl alcohol, beta-propyl allyl alcohol, beta-phenyl allyl alcohol, and the like. Any suitable alkenyl substituted aromatic compound may be used such as, for example, styrene, p-chlorostyrene, m-chlorostyrene, m-ethyl styrene, p-ethoxystyrene, p-ethyl styrene, p-butyl styrene, p-octyl styrene, vinyl toluene, 2,5-dimethyl styrene, 2,5-diethyl styrene, 2,5-dipropyl styrene, 2,5-dibutyl styrene, beta-vinyl naphthylene, 2,4-dichlorostyrene, 2,4-dibromostyrene, allyl benzene and the like. It is preferred to use a copolymer which has an hydroxyl number of from about 170 to about 270. Particularly preferred copolymers are those of allyl alcohol and styrene which have an hydroxyl number of from about 178 to about 198.

Any suitable organic polyisocyanate may be used such as, for example, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Any suitable drying and semi-drying vegetable oil may be used such as, for example, linseed oil, safflower oil, corn oil, sunflower oil, perilla oil, china wood oil, oiticica oil, poppyseed oil, sesame oil, soybean oil or the unsaturated acids from these oils, tall oil and the like.

Any suitable polyhydric alcohol having from 2 to 6 hydroxyl groups may be used. It is preferred that the polyhydric alcohol have a molecular weight below about 500 and from 3 to 5 hydroxyl groups, and most preferably, 3 or 4 hydroxyl groups. Suitable polyhydric alcohols to be used with the hydroxyl-containing copolymer are, for example, ethylene glycol, propylene glycol, 1,4-butane diol, diethylene glycol, dipropylene glycol, thiodiglycol, glycerine, trimethylolpropane, 1,2,6-hexane triol, pentaerythritol, N,N,N',N'-tetrakis-2-hydroxypropyl ethylene diamine, methyl glucoside, arabitol, mannitol, sorbitol and the like.

The modified drying oil of the invention is prepared by any convenient order of addition. In other words, the copolymer of an ethylenically unsaturated monohydric alcohol and an alkenyl substituted aromatic compound may be added first to the vegetable oil and the polyhydric alcohol may be added at a later time or alternately, the alcoholysis product of a vegetable oil with a polyhydric alcohol may be used for subsequent reaction with the copolymer. It is preferred to use a catalyst such as, for example, calcium naphthenate, lead naphthenate, litharge, sodium hydroxide and the like. Regardless of the order of addition, the vegetable oil, the polyhydric alcohol and the copolymer should be heated until alcoholysis has occured, preferably at a temperature within the range of about 200° C. to about 260° C., and then combined at a temperature preferably below about 120° C., best results being obtained in the range between about 40° C. and about 120° C. with an organic polyisocyanate to prepare the modified oils of the invention. It is most preferred to add the polyisocyanate while maintaining the temperature below about 100° C.

In some cases, the oils prepared in accordance with this invention may be used directly for coating substrates but in other cases, it is desirable to employ an inert organic solvent such as, for example, xylene, benzene, toluene, naphtha, mineral spirits, turpentine and the like.

The coating compositions of the invention may be colored with any suitable coloring agent such as, for example, toluidine red, chrome yellow, carbon black, iron oxide, titanium dioxide, zinc oxide, phthalocyanine green and blue, aluminum flakes and the like.

The ratio of the organic polyisocyanate to the total hydroxyl bearing material is important. It is preferred that the ratio of free —NCO groups to free hydroxyl groups be within the range of from about 0.8 to about 1.05. A satisfactory —NCO/—OH ratio is about one. Moreover, it is necessary as pointed out above that the amount of copolymer of an ethylenically unsaturated monohydric alcohol and an alkenyl substituted aromatic compound be within the range of from about 2 percent by weight to about 25 percent by weight and it is preferred that the amount of organic polyisocyanate be sufficient to bring the total percentage of copolymer and diisocyanate in the reaction mixture to a total of between about 20 percent by weight and about 45 percent by weight. In other words, the amount of organic polyisocyanate used is preferably dependent on the amount of copolymer used. The balance of the reaction mixture in each instance being the vegetable oil and polyhydric alcohol. The temperature at which the polyisocyanate and other reactive components are combined is preferably within the range of from about 40° C. to about 120° C. It is desirable to allow the reaction mixture to cool below about 40° C. before the addition of any dryers or other conventional additives for urethane oils such as, for example, the naphthenates, linseedates, tallates and the like of cobalt, lead, manganese, zirconium, the rare earth metals and the like.

The drying oils of this invention make it possible to achieve a chemical resistance heretofore impossible with the conventional urethane oils. More striking, however, is the development that a high degree of hardness may be obtained without subsequent loss in the flexibility of the coating. It was to be expected that if the hardness of the coating increased, the flexibility would decrease but this has not been found to be the case. Instead, as the hardness increases, the flexibility has remained within satisfactory limits. Moreover, these coatings have improved resistance to weathering. They do not chalk as clear coatings or to any serious extent when pigmented as described above.

The coating compositions of the invention may be used for coating many different types of substrates for protection against the elements as well as extraordinary conditions where high chemical resistance is necessary. Substrates which may be coated include wood, metal such as steel, copper, aluminum and the like either with or without the conventional primer coatings for such materials.

The invention is further illustrated by the following examples on which the parts are by weight unless otherwise specified. In these examples, the "Taber Index" is measured with an abrasion instrument by placing a coated panel beneath a revolving abrasive wheel (designated CS-10 by the Taber Company) on which has been placed a 1000 gram weight. The Taber index is the weight loss in milligrams per 1000 revolutions of the wheel. "Reverse Impact" is measured by dropping a weight onto the reverse side of a coated panel. The number of inch-pounds of force required to break the surface of the coating is measured. Any value above 40 inch-pounds is very good. "Sward Hardness" is measured with chrome plated bronze rings which rock or oscillate on the surface. The harder the coating, the higher the number of oscillations. "Chemical Resistance" is measured by immersing coated steel panels in the named chemicals.

*Example 1*

About 308 parts of linseed oil are added to a one-liter 3-necked flask equipped with a heating mantle, stirrer, thermometer and nitrogen sweep, about 31.5 parts of glycerine, about 10.5 parts of a styrene-allyl alcohol copolymer having an hydroxyl number of about 187 and about 0.8 part of calcium naphthenate are added with stirring and the mixture is held at about 250° C. for about two hours. The resulting alcoholysis product is then allowed to cool to 50° C. and about 89.5 parts of the mixture of 80 percent 2,4- and 20 percent 2,6-toluylene diisocyanate is added slowly while controlling the exotherm of the reaction by addition of xylol or cooling. The mixture is then heated at about 95° C. for about two hours. About 50 percent by weight of xylene is added to thin the modified oil and after about two days, about 0.5 percent lead naphthenate and about 0.05 percent cobalt naphthenate are added with stirring.

The resulting oil is applied to steel panels and glass panels and exhibits the following properties:

Reverse impact _____ 160 inch-pounds (minimum).
Sward hardness _____ 20.
Taber index _____ 93 mg.
Chemical resistance:
    5% NaOH _____ 72 hours to complete failure.
    Deionized water _____ 3 hours to soften.
    Hydrocarbons _____ 24 hours to soften.

*Example 2*

Example 1 was repeated except that about 291.2 parts of linseed oil, about 44.1 parts of glycerine, about 14.7 parts of styrene-allyl alcohol copolymer and about 125 parts of the mixture of toluylene diisocyanates is used. Sufficient xylene is added to yield a composition having 50 percent solids and the resulting oil is applied to a 1" x 3" steel panel where it exhibits the following physical properties:

Reverse impact _____ 160 inch-pounds (minimum).
Sward hardness _____ 28.
Taber index _____ 75 mg.
Chemical resistance:
    5% NaOH _____ 168 hours to complete failure.
    Deionized water _____ 24 hours to soften.
    Hydrocarbons _____ 168 hours no effect.

*Example 3*

About 551 parts of tall oil fatty acids, about 116 parts of glycerol, about 164 parts of a styrene-allyl alcohol copolymer having an hydroxyl number of about 187, about 2.0 parts calcium naphthenate and about 40 parts xylene are added to a two-liter 3-necked flask equipped with nitrogen sweep, stirrer, trap and condenser and heated gradually to a temperature of about 230° C. over a period of about 5 hours and then held at this temperature for about 1 hour at which time the theoretical amount of water has been removed. The heat is turned off and the reaction mixture is allowed to cool to about 50° C. The cooling period is about 2 hours. The total water loss is about 35 parts by weight. Then about 204 parts of a mixture of 80 percent 2,4- and 20 percent 2,6-toluylene diisocyanate is added slowly over 30 minutes while adding xylene sufficient to control the exotherm of the reaction so that the temperature of the reaction remains at about 65° C. Then the reaction mixture is heated to a temperature of about 90° C. and held for 2 hours. Additional xylene is then added to reduce the mixture to approximately a 50 percent solution of solids in xylene.

The resulting urethane oil is cooled and stored for about 2 days prior to the addition of dryers and pigments. A typical coating composition based on this urethane oil contains 98.8 parts of the modified oil, 0.8 part of lead naphthenate, 0.3 part of cobalt naphthenate and 0.1 part of an anti-skinning agent sold under the name ASA. These solids are then diluted with an equal part by weight of xylene.

This coating composition was coated on a steel substrate and exhibited the following physical properties:

Reverse impact _____ 160 inch-pounds (minimum).
Sward hardness _____ 18.
Taber index _____ 80 mg.

*Example 4*

Following the procedure of Example 3 except that 58.5 parts of tall oil fatty acids, 15.6 parts of glycerol, 15.6 parts of styrene-allyl alcohol and 26.4 parts of the toluylene diisocyanate mixture are used, a similar coating is obtained which when applied to a substrate has the following physical properties:

Reverse impact _____ 160 inch-pounds (minimum).
Sward hardness _____ 22.
Taber index _____ 72 mg.

It is to be understood that the foregoing examples are given for the purpose of illustration and that any other suitable organic polyisocyanate, copolymer, vegetable oil, polyhydric alcohol, catalyst, dryer and the like could have been used provided that the teachings of this disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A polyurethane prepared by a process which comprises reacting an organic polyisocyanate with the reaction product of a vegetable oil which is substantially free of hydroxyl groups, unsaturated acids of these oils or tall oil, a low molecular weight polyhydric alcohol having 2 to 6 hydroxyl groups and from about 2 percent to about 25 percent by weight of said reaction product of a copolymer of an ethylenically unsaturated monohydric alcohol having only one ethylenically unsaturated group and an alkenyl substituted aromatic compound having only one ethylenically unsaturated group, the —NCO to —OH ratio being within the range of from about 0.8 to about 1.05.

2. A polyurethane coating composition which comprises an inert organic solvent solution of a reaction product prepared by a process which comprises reacting an organic polyisocyanate with a reaction product prepared by a process which comprises reacting a tall oil, a low molecular weight polyhydric alcohol having from 2 to 6 hydroxyl groups and from about 2 percent to about 25 percent by weight of said reaction product of a copolymer of an ethylenically unsaturated monohydric alcohol having only one ethylenically unsaturated group and an alkenyl substituted aromatic compound having only one ethylenically unsaturated group, the —NCO to —OH ratio being within the range of from about 0.8 to about 1.05.

3. A coating composition which comprises an inert organic solvent solution of (1) a reaction product prepared by a process which comprises reacting a vegetable oil which is substantially free of hydroxyl groups, unsaturated acids of these oils or tall oil, a polyhydric alcohol having from 3 to 5 hydroxyl groups and a molecular weight below about 500 and from about 2 percent to about 25 percent by weight of said reaction product of a copolymer of allyl alcohol and a styrene with (2) from about 15 parts to about 30 parts of toluylene diisocyanate, and sufficient parts of (1) to make 100 parts.

4. The polyurethane of claim 1 wherein said polyhydric alcohol has from 3 to 4 hydroxyl groups.

5. The polyurethane of claim 1 wherein said vegetable oil is linseed oil.

6. The polyurethane of claim 1 wherein said copolymer has an hydroxy number of from about 170 to about 270.

7. The coating composition of claim 3 wherein said styrene-allyl alcohol copolymer has an hydroxyl number of from about 178 to about 198.

8. The polyurethane of claim 1 wherein the reaction product of said copolymer, said polyhydric alcohol and said vegetable oil is heated to a temperature within the range of from about 200° C. to about 260° C.

9. The polyurethane plastic of claim 1 wherein said organic polyisocyanate is reacted with the reaction product from about 50 to about 80 parts by weight of a vegetable oil which is substantially free of hydroxyl groups, unsaturated acids of these oils or tall oil, from about 2 to about 25 parts by weight of a copolymer of allyl alcohol and styrene and the balance sufficient to make 100 parts by weight of a polyhydric alcohol having 2 to 6 hydroxyl groups.

10. The polyurethane of claim 1 wherein said organic polyisocyanate is reacted with the reaction product of tall oil, a low molecular weight polyhydric alcohol having 2 to 6 hydroxyl groups and from about 2 percent to about 25 percent by weight of said reaction product of a copolymer of an ethylenically unsaturated monohydric alcohol having only one ethylenically unsaturated group and an alkenyl substituted aromatic compound having only one ethylenically unsaturated group, the —NCO to —OH ratio being within the range of from about 0.8 to about 1.05.

References Cited by the Examiner

UNITED STATES PATENTS

| 2,374,136 | 4/1945 | Rothrock | 260—22 |
| 2,609,349 | 9/1952 | Cass | 260—23 |
| 2,634,244 | 4/1953 | Simon et al. | 260—75 X |
| 2,884,340 | 4/1959 | Loshaek | 260—45.4 X |

LEON J. BERCOVITZ, *Primary Examiner.*

MILTON STERMAN, *Examiner.*

T. D. KERWIN, R. A. WHITE, *Assistant Examiners.*